United States Patent Office 3,219,660
Patented Nov. 23, 1965

---

3,219,660
FORMYLPHENOXYMETHYL PENICILLINS
Josef Hoffman, Milos Herold, Vladimir Toscani, and Miloslav Vondracek, all of Prague, Czechoslovakia, assignors to Spofa, sdruzeni podniku pro Zdravotnickou vyrobu, Prague, Czechoslovakia
No Drawing. Filed Oct. 18, 1963, Ser. No. 317,153
Claims priority, application Czechoslovakia, Oct. 19, 1962, 5,916/62
8 Claims. (Cl. 260—239.1)

The invention relates to new semisynthetic penicillins of general Formula I

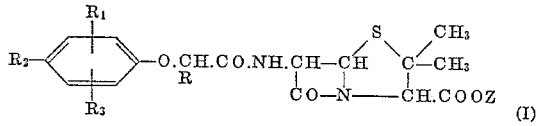

wherein R stands for hydrogen, alkyl with 1–4 carbon atoms, or phenyl, $R_1$ for the group —CHO in o- or m-position to phenoacyl, $R_2$ and $R_3$, which are identical or different, represent hydrogen, alkyl or alkoxyl with 1–4 carbon atoms, hydroxyl, halogen, the group —$NO_2$ or —$NH_2$, which substituents, as the case may be, may together form a further condensed aromatic ring, and Z represents hydrogen, or a cation of an inorganic or organic base, especially of an aliphatic or arylaliphatic amine or diamine, and to the method of preparing said new semisynthetic penicillins of general Formula I.

It has been found that the new semisynthetic penicillins of general Formula I are noted not only for high stability in acid medium, but also for the increased effect, compared with known penicillins, e.g. against Staphylococci, this even in great dilution.

According to the invention, the new penicillins of general Formula I are prepared by condensing an acid of general Formula II

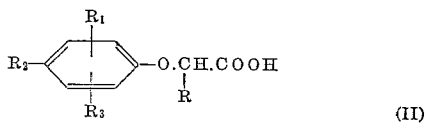

wherein R, $R_1$, $R_2$, and $R_3$ are the same as in the Formula I, or a derivative thereof, such as a halide (e.g. chloride), or anhydride, with 6-aminopenicillanic acid or its salt.

The starting acids of general Formula II can be easily prepared by means of general reactions from the corresponding o- or m-hydroxyaldehydes, e.g. by condensation with -halocarboxylic acids.

The proper reaction of the acid of general Formula II with 6-aminopenicillanic acid or its salt can be carried out in the medium of an organic water-miscible solvent, e.g. tetrahydrofurane, in the presence of dicyclohexyl carbodiimide as the condensation agent. It can be carried out as well by first reacting the acid of general Formula II with chlorocarbonic acid ester so as to form the mixed anhydride, which is then made to react with 6-aminopenicillanic acid, or its salt, respectively.

The new penicillins of general Formula I thus obtained are then isolated from the reaction medium either in the form of free acids, or in the form of salts with suitable inorganic or organic bases.

The constitution of the new penicillins was verified by infra-red spectra, the content by the hydroxylamine method, and the effect by means of microbiological tests and comparison with known penicillins.

EXAMPLES

1. o-Aldophenoxymethyl penicillin 1 g. of o-aldophenoxyacetic was dissolved in 5 ml. tetrahydrofurane, and a solution of 1 g. dicyclohexyl carbodiimide in 3 ml. tetrahydrofurane added. The mixture was introduced into a solution of 1.2 g. of 6-aminopenicillanic acid sodium salt in 8 ml. water, and it was stirred for 60 minutes at room temperature. The eliminated dicyclohexyl urea was sucked off, and the filtrate, after having been acidified to pH 2, was extracted by shaking with 30 ml. butyl acetate. The organic solvent layer was separated, dried, and the penicillin thus formed and contained in the mixture was precipitated in the form of the potassium salt by addition of a saturated solution of potassium acetate in n-butanol. The precipitated salt was sucked off and washed with a small volume of absolute ethanol. Yield 0.8 g. The potassium salt of the new penicillin is a white crystalline powder, easily soluble in water, with M.P. 210° C. The effect on Bacillus subtilis corresponds to 480 u./mg., compared with penicillin G. In a Staphylococcus strain partially resistant against penicillin G, in dilution of 5 gamma/ml. a 5-times higher effect than with penicillin G (determined by the diffusion method) has been established.

2. 2-Formyl-4,6-dichlorophenoxymethyl penicillin

Using the same procedure as in Example 1, there was obtained from 1 g. 2-formyl-4,6-dichlorophenoxyacetic acid, dicyclohexyl carbodiimide and 6-aminopenicillanic acid sodium salt a solution of the sodium salt of the new penicillin, from which by distilling off the hydrofurane in vacuo and lyophilization a powdery substance, easily water-soluble, was obtained. The new penicillin is highly acido-stable and effective against a resistant strain of Staphylococcus.

3. m-Aldophenoxymethyl penicillin

By the same procedure as described in Example 1, there was obtained from 1 g. m-aldophenoxyacetic acid 0.92 g. of the potassium salt of the new penicillin, showing a high effect against Staphylococci. M.P. 250° C. (decomp.).

4. 4-formyl-3-ethoxy-phenoxymethyl penicillin

By the same procedure as described in Example 1, there was obtained from 1.0 g. 4-aldo-3-ethoxyphenyl acetic acid by reacting it with 1.0 g. 6-aminopenicillanic acid and 1.0 g. dicyclohexyl carbodiimide the new penicillin in the form of its potassium salt with M.P. 190–191° C. Yield 1.2 g.

5. 2-formyl-6-ethoxy-phenoxymethyl penicillin 1.0 g. 6-aminopenicillanic acid was dissolved in 5 ml. water with addition of 0.4 g. $NaHCO_3$, and the solution allowed to react under stirring with a mixture of 1 g. 2-formyl-6-ethoxyphenyl acetic acid and 1.0 g. dicyclohexyl carbodiimide in 5 ml. tetrahydrofurane. After 30 minutes stirring the reaction mixture was diluted with 10 ml. water, sucked off, and the filtrate shaken 2× with 20 ml. ether each. From the aqueous phase, by acidification with 2 g. citric acid, the corresponding penicillin in the form of a crystalline acid with M.P. 147° C. was eliminated. Yield 0.82 g.

We claim:
1. A compound selected from the group consisting of compounds of the formula:

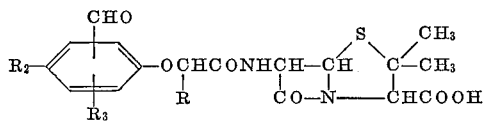

wherein R is selected from the group consisting of hydrogen, alkyl of 1–4 carbon atoms and phenyl, wherein $R_2$ is selected from the group consisting of hydrogen, alkyl of 1–4 carbon atoms, alkoxy of 1–4 carbon atoms, hydroxyl, halogen, —$NO_2$ and —$NH_2$, wherein the formyl group is located in the ortho or meta position and wherein $R_3$ is selected from the group consisting of hydrogen, alkyl of 1–4 carbon atoms, alkoxy of 1–4 carbon atoms, hydroxyl, halogen, —$NO_2$ and —$NH_2$; and non-toxic salts thereof.

2. o-Aldophenoxymethyl penicillin.

3. The potassium salt of o-aldophenoxymethyl penicillin.

4. m-Aldophenoxymethyl penicillin.

5. The potassium salt of m-aldophenoxymethyl penicillin.

6. 2-formyl-4,6-dichlorophenoxymethyl penicillin.

7. The potassium salt of 4-formyl-3-ethoxphenoxymethyl penicillin.

8. 2-formyl-5-ethoxyphenoxymethyl penicillin.

References Cited by the Examiner

UNITED STATES PATENTS

| | | | |
|---|---|---|---|
| 3,040,033 | 6/1962 | Celmer | 260—239.1 |
| 3,093,633 | 6/1963 | Hobbs | 260—239.1 |

FOREIGN PATENTS

| | | |
|---|---|---|
| 877,120 | 9/1960 | Great Britain. |

NICHOLAS S. RIZZO, *Primary Examiner.*